(12) United States Patent
Ueki et al.

(10) Patent No.: US 12,019,595 B2
(45) Date of Patent: Jun. 25, 2024

(54) FAILURE PROBABILITY EVALUATION SYSTEM

(71) Applicant: Hitachi, Ltd., Tokyo (JP)

(72) Inventors: Yosuke Ueki, Tokyo (JP); Takahide Shinge, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/636,606

(22) PCT Filed: Nov. 19, 2020

(86) PCT No.: PCT/JP2020/043161
§ 371 (c)(1),
(2) Date: Feb. 18, 2022

(87) PCT Pub. No.: WO2021/100800
PCT Pub. Date: May 27, 2021

(65) Prior Publication Data
US 2022/0300470 A1 Sep. 22, 2022

(30) Foreign Application Priority Data
Nov. 21, 2019 (JP) .................. 2019-210295

(51) Int. Cl.
*G06F 16/215* (2019.01)
*G06F 16/21* (2019.01)
*G06F 16/25* (2019.01)
(52) U.S. Cl.
CPC .......... *G06F 16/215* (2019.01); *G06F 16/219* (2019.01); *G06F 16/254* (2019.01)
(58) Field of Classification Search
CPC .... G06F 16/215; G06F 16/219; G06F 16/254; G06Q 10/20
See application file for complete search history.

(56) References Cited

U.S. PATENT DOCUMENTS

2006/0265261 A1  11/2006  Wetzer et al.
2007/0239368 A1* 10/2007  Marrano ................ G06Q 10/06
                                                            702/33
(Continued)

FOREIGN PATENT DOCUMENTS

JP   2004-191359 A    7/2004
JP   2005-085178 A    3/2005
JP   2019-160128 A    9/2019

OTHER PUBLICATIONS

International Search Report with English translation and Written Opinion issued in corresponding application No. PCT/JP2020/043161 dated Jan. 12, 2021.
(Continued)

*Primary Examiner* — Maher N Algibhah
(74) *Attorney, Agent, or Firm* — Foley & Lardner LLP (57) ABSTRACT

The problem of the present invention is how to identify a failure probability function that defines failure occurrences of a device or a component of the device that is operated while undergoing maintenance in consideration of effects of the maintenance. A failure probability evaluation system deals with a device or a component of the device that undergoes maintenance (hereinafter, referred to as an item), and the failure probability evaluation system includes: a failure probability function identification unit 12 for calculating the failure probability function of the item on the basis of survival data represented as a relationship between a cumulative operation time period and a failure state; and a maintenance effect correction unit 9 for correcting the cumulative operation time period in the survival data on the basis of a maintenance effect parameter that defines a damage recovery effect or a damage accumulation suppression effect for the item brought about by maintenance, wherein the failure probability function identification unit 12 includes an optimization function for optimizing the main-
(Continued)

tenance effect parameter so as to reduce a dispersion degree index of the failure probability function.

10 Claims, 8 Drawing Sheets

(56) References Cited

U.S. PATENT DOCUMENTS

| | | | |
|---|---|---|---|
| 2015/0363750 A1* | 12/2015 | Svensson | G06Q 10/20 |
| | | | 702/34 |
| 2016/0292652 A1* | 10/2016 | Bowden, Jr. | G06Q 10/20 |
| 2019/0147413 A1 | 5/2019 | Johnson et al. | |
| 2021/0089928 A1 | 3/2021 | Ueki | |

OTHER PUBLICATIONS

Office Action issued in corresponding Australian Patent Application No. 2020389306, dated Feb. 20, 2023 (10 pages).
Extended European Search Report issued in corresponding European Patent Application No. 20889132.5, dated Oct. 26, 2023 (8 pages).

* cited by examiner

| FAILURE OCCURRENCE DATE | | MAINTENANCE EXECUTION DATE | | MAINTENANCE SCHEME | OPERATOR |
|---|---|---|---|---|---|
| 2016/1/3 | 9:32 | 2016/1/4 | 9:32 | REPLACEMENT | A |
| 2016/5/15 | 4:21 | 2016/5/18 | 4:21 | DISASSEMBLY AND CLEANING | A |
| 2016/12/20 | 17:53 | 2016/12/21 | 17:53 | SIMPLE CLEANING | B |
| 2017/3/20 | 1:03 | 2017/3/22 | 1:03 | SIMPLE CLEANING | A |
| 2017/3/29 | 13:21 | 2017/3/31 | 13:21 | REPLACEMENT | C |
| 2017/10/4 | 13:21 | 2017/10/4 | 13:21 | SIMPLE CLEANING | B |
| ⋮ | ⋮ | ⋮ | ⋮ | ⋮ | ⋮ |
| 2018/1/3 | 22:39 | 2018/1/3 | 22:39 | DISASSEMBLY AND REPLACEMENT | A |

FIG. 3

| CUMULATIVE OPERATION TIME PERIOD [MINUTE] | OUTCOME | MAINTENANCE SCHEME | OPERATOR |
|---|---|---|---|
| 1254 | FAILURE | DISASSEMBLY AND CLEANING | A |
| 1801 | FAILURE | DISASSEMBLY AND CLEANING | B |
| 2204 | FAILURE | DISASSEMBLY AND CLEANING | A |
| 2549 | FAILURE | REPLACEMENT | C |
| 3178 | PRIOR MAINTENANCE | SIMPLE CLEANING | C |
| 3264 | FAILURE | REPLACEMENT | A |
| ⋮ | ⋮ | ⋮ | ⋮ |
| 5495 | PRIOR MAINTENANCE | REPLACEMENT | A |

| CUMULATIVE OPERATION TIME PERIOD [MINUTE] | OUTCOME | MAINTENANCE SCHEME | OPERATOR |
|---|---|---|---|
| 1606 | FAILURE | DISASSEMBLY AND CLEANING | A |
| 2153 | FAILURE | DISASSEMBLY AND CLEANING | B |
| 2556 | FAILURE | DISASSEMBLY AND CLEANING | A |
| 2549 | FAILURE | REPLACEMENT | C |
| 3942 | PRIOR MAINTENANCE | SIMPLE CLEANING | C |
| 3264 | FAILURE | REPLACEMENT | A |
| ⋮ | ⋮ | ⋮ | ⋮ |
| 5495 | PRIOR MAINTENANCE | REPLACEMENT | A |

FAILURE PROBABILITY EVALUATION SYSTEM

TECHNICAL FIELD

The present invention relates to technologies for evaluating the failure probabilities of devices to be under maintenance. Here, it will be assumed that failures include troubles such as so-called impediments. In addition, the maintenance also includes prior maintenance and posterior maintenance, and further includes repair.

BACKGROUND ART

In a machine system such as a power generation machine or a transport machine, it is extremely important that the lifespans of respective parts are appropriately grasped and managed and that maintenance such as the repair or replacement of each part is executed at an appropriate timing in order to make the system perform its predefined function normally. For example, statistically analyzing the records of failures that occurred in the past and maintenances makes it possible to estimate the number of failure events that will occur in the future or to estimate a time period between the present time and a time when a system operating now will be in a failure state (life expectancy).

Here, in some machine systems, loads borne by the respective parts or components may momentarily vary depending on the operation states of the machine systems. PTL 1 discloses an invention in which a failure probability function is identified by executing a survival time period analysis in consideration of an operation state that varies over time in such a way. In this way, sensor data is utilized for the estimation of the number of failures and life expectancies, and appropriate load factors are automatically searched for in PTL 1.

CITATION LIST

Patent Literature

PTL 1: Japanese Patent Application Laid-Open No. 2019-160128

SUMMARY OF INVENTION

Technical Problem

As described in the paragraph of Background Art, it is possible to statistically analyze the life span of an operated device while undergoing maintenance using a survival time period analysis. However, the categories of maintenance are not only the category of preventive maintenance and that of posterior maintenance.

For example, even in cases where recovering the state of a target item is an objective, there are plural maintenance schemes such as executing disassembly-and-cleaning on the target item, executing simple cleaning on the target item, and the like. In a case where plural types of maintenance are applied to a single item in this way, it is obvious that the degrees of recovery of the state of the item (maintenance effects) are different from one another depending on the types of maintenance scheme applied to the item. Furthermore, even in the case where the same type of maintenance is applied, it is possible that the maintenance effect varies depending on the skill of a person in charge of executing the maintenance. If the maintenance effects can be quantitatively expressed, it becomes possible that a survival time period analysis is applied by executing some type of correction. In reality, however, it is difficult to quantitatively express state recovery effects for the respective contents of maintenances.

Therefore, since these maintenance effects cannot be reflected in a failure probability function, only a failure probability function having a comparatively large dispersion degree could be obtained. Since the dispersion degree of a failure probability function corresponds to the variation of the life span of the relevant item, it was eventually impossible to improve the accuracy of the life span estimation of the item. With such a background, the advent of a statistical analysis system that deals with the life spans of devices that are operated while undergoing plural types of maintenance has been wanted.

Solution to Problem

In order to solve the abovementioned problem, in the present invention, while taking into consideration the maintenance of a device or a component of the device (hereinafter, referred to as an item), life span estimation is executed by executing correction for at least one of a "cumulative operation time period" and a "cumulative load." Here, a "cumulative operation time period" is an operation time period between two maintenances.

In addition, "correction" includes changes regarded as getting back time in a pseudo manner, as delaying degradation, and as varying a load. Furthermore, executing correction in accordance with the type of maintenance (maintenance scheme) under consideration in order to give these changes is also an aspect of the present invention. Here, the maintenance under consideration includes maintenance that has already been executed and maintenance that is scheduled to be executed.

As a concrete example, a configuration described in the scope of claims of the present invention will be adopted. To put it concretely, the configuration is a configuration of a failure probability evaluation system for evaluating a failure probability of an item, including: means for receiving maintenance event data including a maintenance scheme for maintenance applied to the item and the time of the maintenance, and failure event data including a state about the failure of the item and an occurrence time of the state; means for generating survival time period data that associates a cumulative operation time period which shows an operation time period between two maintenances of the item, the state, and the maintenance scheme using the maintenance event data and the failure event data, and means for generating an equivalent cumulative operation time period by correcting the cumulative operation time period on the basis of the associated maintenance scheme and for calculating a failure probability function of the item using the generated equivalent cumulative operation time period and the associated maintenance scheme. In addition, the present invention includes a method using this system and program products for performing this method.

Advantageous Effects of Invention

The present invention makes it possible to estimate the number of failures and life spans more accurately since the present invention includes a function for reflecting maintenance effects.

DESCRIPTION OF EMBODIMENTS

Hereinafter, examples of the present invention will be explained with reference to the accompanying drawings.

Example 1

First, an example of the present invention will be explained by taking a failure probability evaluation system as an example in which a filter installed in a pipe is an item on which three types (schemes) of maintenance (replacement, disassembly-and-cleaning, and simple cleaning) that respectively have different damage recovery effects from one another are executed.

Figure 1:
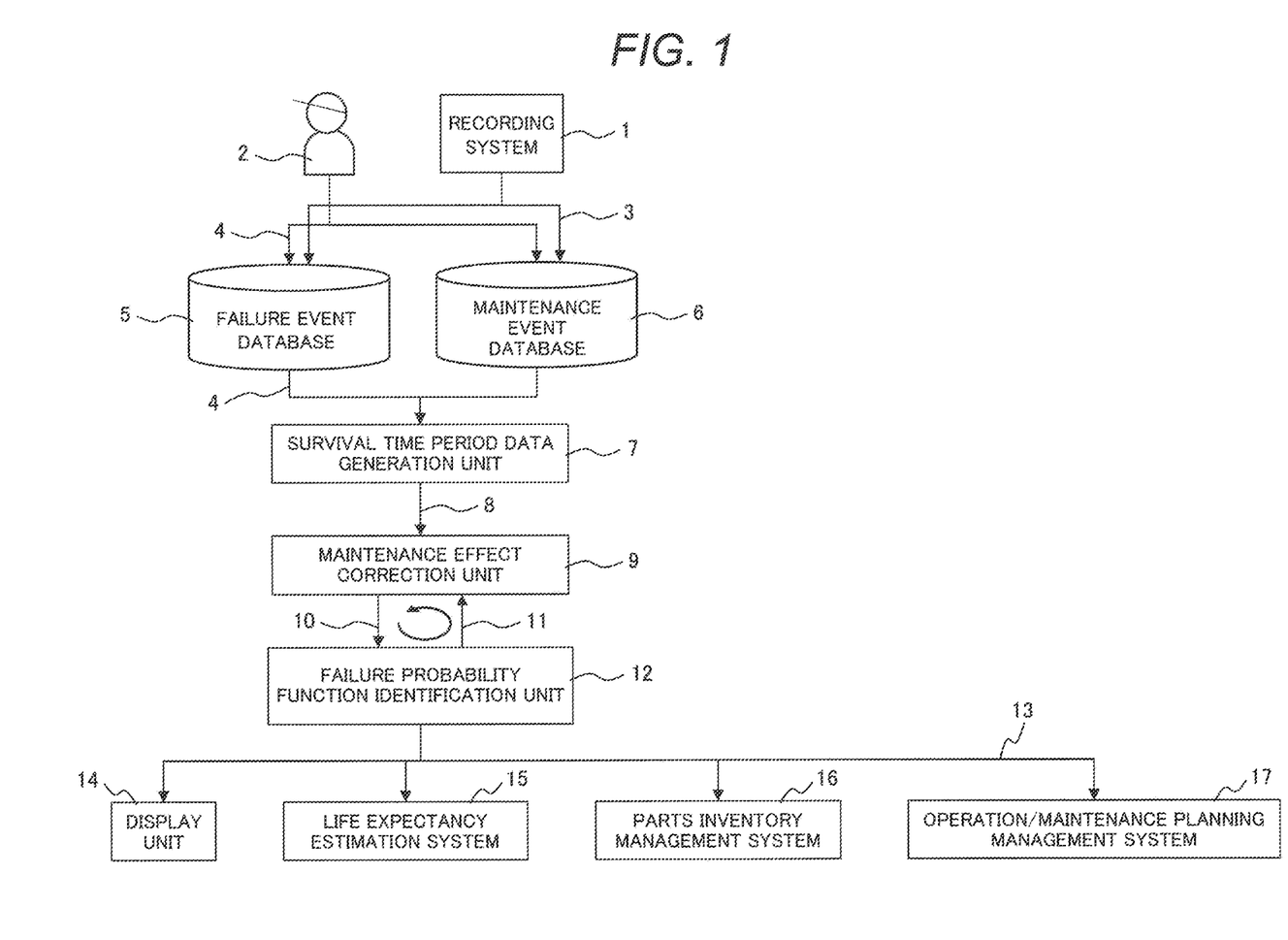
FIG. 1 is the configuration diagram of an example of a failure probability evaluation system according to an example of the present invention.
Figure 2:
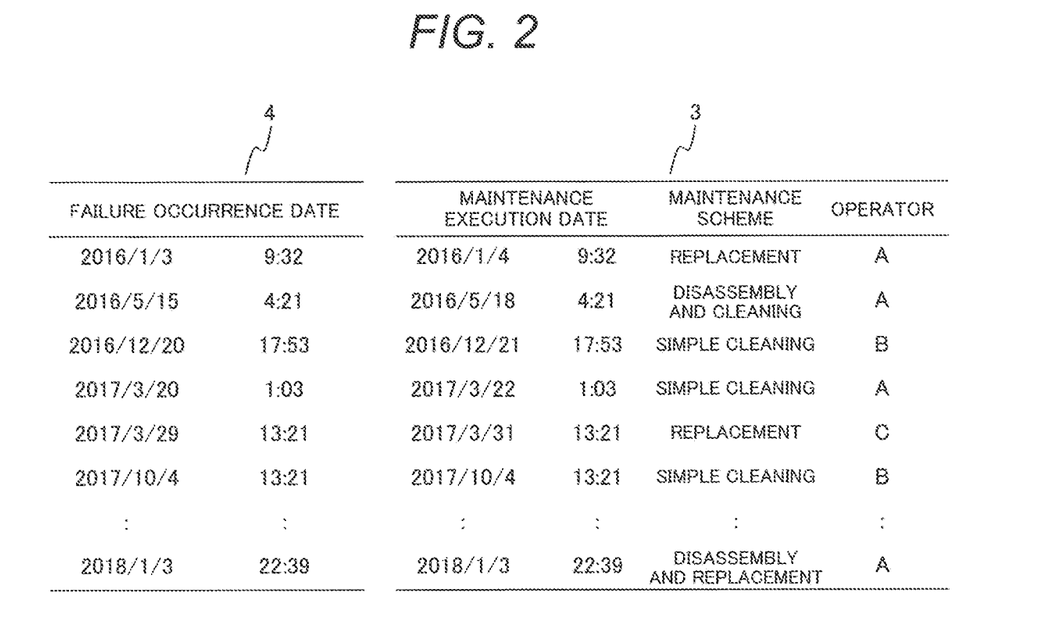
FIG. 2 is a diagram showing failure event data 4 and maintenance event data 3 used in the example of the present invention.

FIG. 1 shows an example of the configuration of a failure probability evaluation system according to this example. A failure event database 5 stores failure event data 4 including the failure occurrence times of the item. Furthermore, a maintenance event database 6 records maintenance event data 3 including pairs of maintenance execution time data and executed maintenance scheme data. In some cases, as shown in FIG. 2, a scheme in which information about operators in charge of the maintenances is recorded may be useful. In addition, although the number of types of maintenance is set to three in this case, this example sets no restrictions to the number. Furthermore, a scheme in which an operator 2 manually inputs data into both databases (5 and 6) on the basis of the observation results of the item or the executions of maintenances may be adopted. However, especially in the case of the failure event database 5, it is desirable that a scheme in which failure event data 4 should be automatically inputted by a recording system 1 on the basis of the results of state monitoring executed by sensors.

Figure 3:
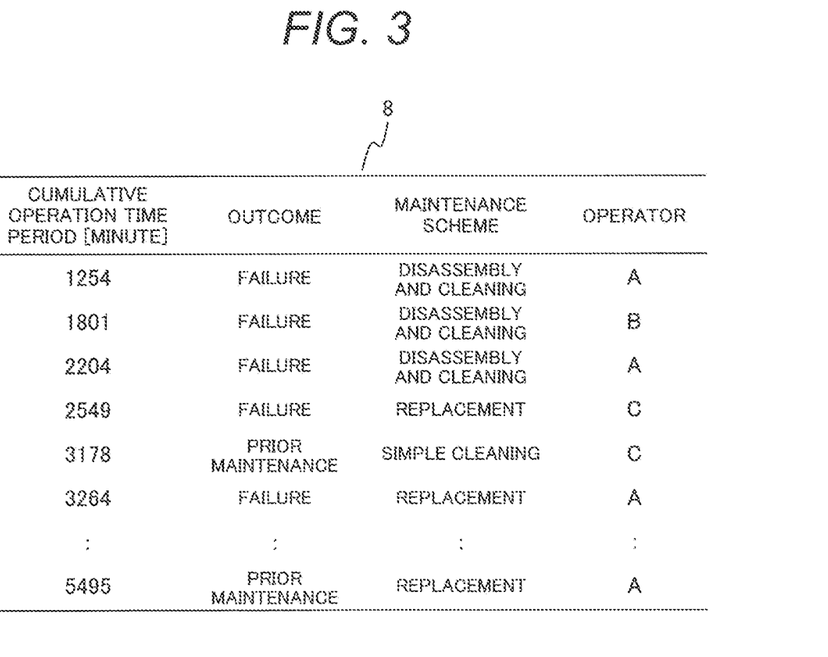
FIG. 3 is a diagram showing survival time period data according to the example of the present invention.

Next, a survival time period data generation unit 7 will be explained. In the survival time period data generation unit 7, the following data is generated on the basis of failure event data 4 data stored in the failure event database 5 and maintenance event data 3 stored in the maintenance event database 6. The data is survival time period data 8 that is composed of pairs of cumulative operation time periods of the item, the states of the item after the elapses of the operation time periods (outcomes), and maintenance schemes. Here, an outcome is a label that represents whether the item is in a failed state or surviving at the time when a cumulative operation time period elapses. If the item is operated while undergoing maintenance, the item is not in a failed state at the time when prior maintenance is executed on the item, so that the item is labeled with survival (prior maintenance). It is sufficient that a dataset that is used for a usual survival time period analysis includes a pair of a cumulative operation time period and an outcome. However, in this example, since information about maintenance executed at the time when a cumulative operation time period of interest is equal to 0 becomes important, a maintenance scheme is also stored in the dataset as well as the pair of the cumulative operation time period and the outcome. As mentioned above, if there is a large possibility that a maintenance effect differs greatly depending on an operator who executes the relevant maintenance, information about operators who execute maintenances may be stored as shown in FIG. 3.

Figure 4:
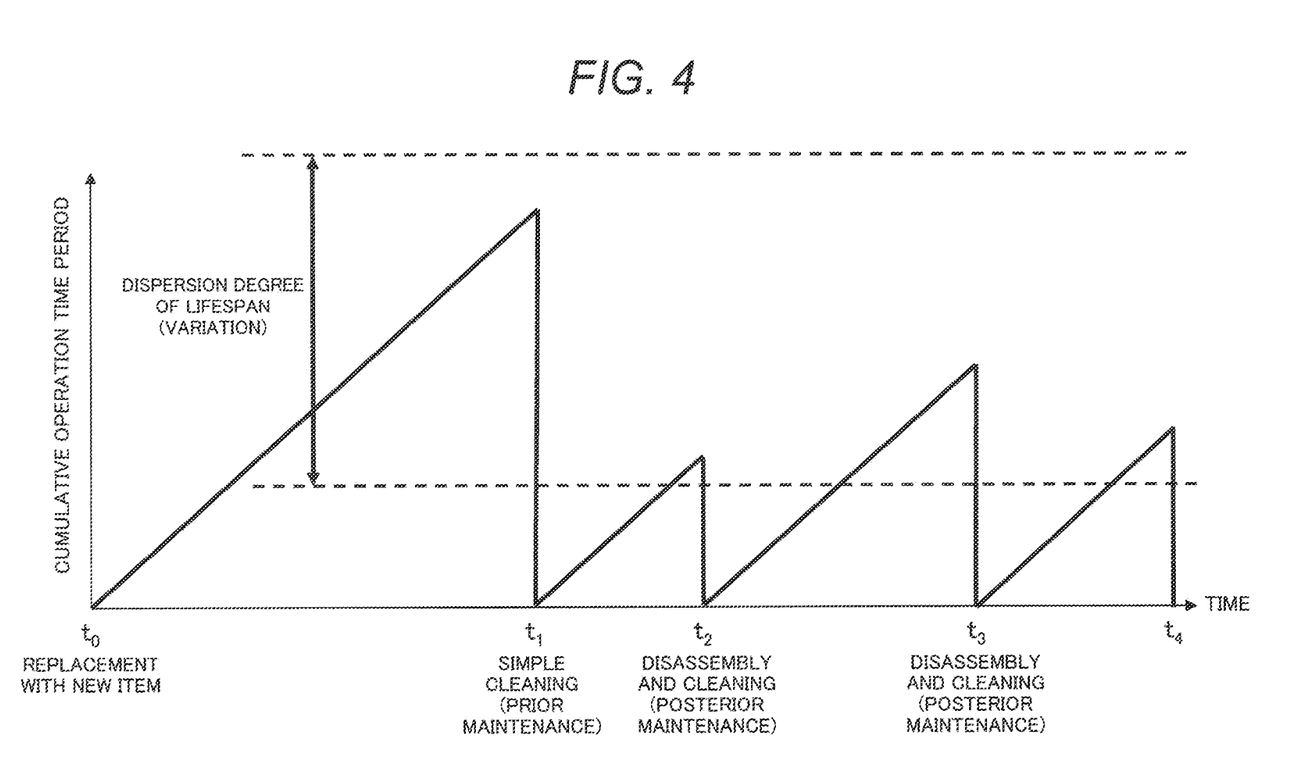
FIG. 4 is a schematic diagram showing a relationship between failure occurrences/maintenance executions and cumulative operation time periods according to the example of the present invention.

Next, a maintenance effect correction unit 9 will also be explained. FIG. 4 shows a relationship between cumulative operation time periods and the timings of failure occurrences/maintenance executions in a schematic way. For example, after replacement with a new item is made as maintenance at time $t_0$, the life span of the item can be expected to become comparatively long. On the other hand, after disassembly-and-cleaning ($t_2$) or simple cleaning ($t_1$) is made as maintenance, the life span of the item is expected to become relatively short. In the case of the usual survival time period analysis being executed, what type of maintenance has been made until a failure occurs is not taken into consideration. Therefore, it is inevitable that a failure probability density function obtained by the survival time period analysis becomes a probability density function having a large dispersion degree expressed by an index such as a variance, a standard deviation, or a variation error.

Figure 5:
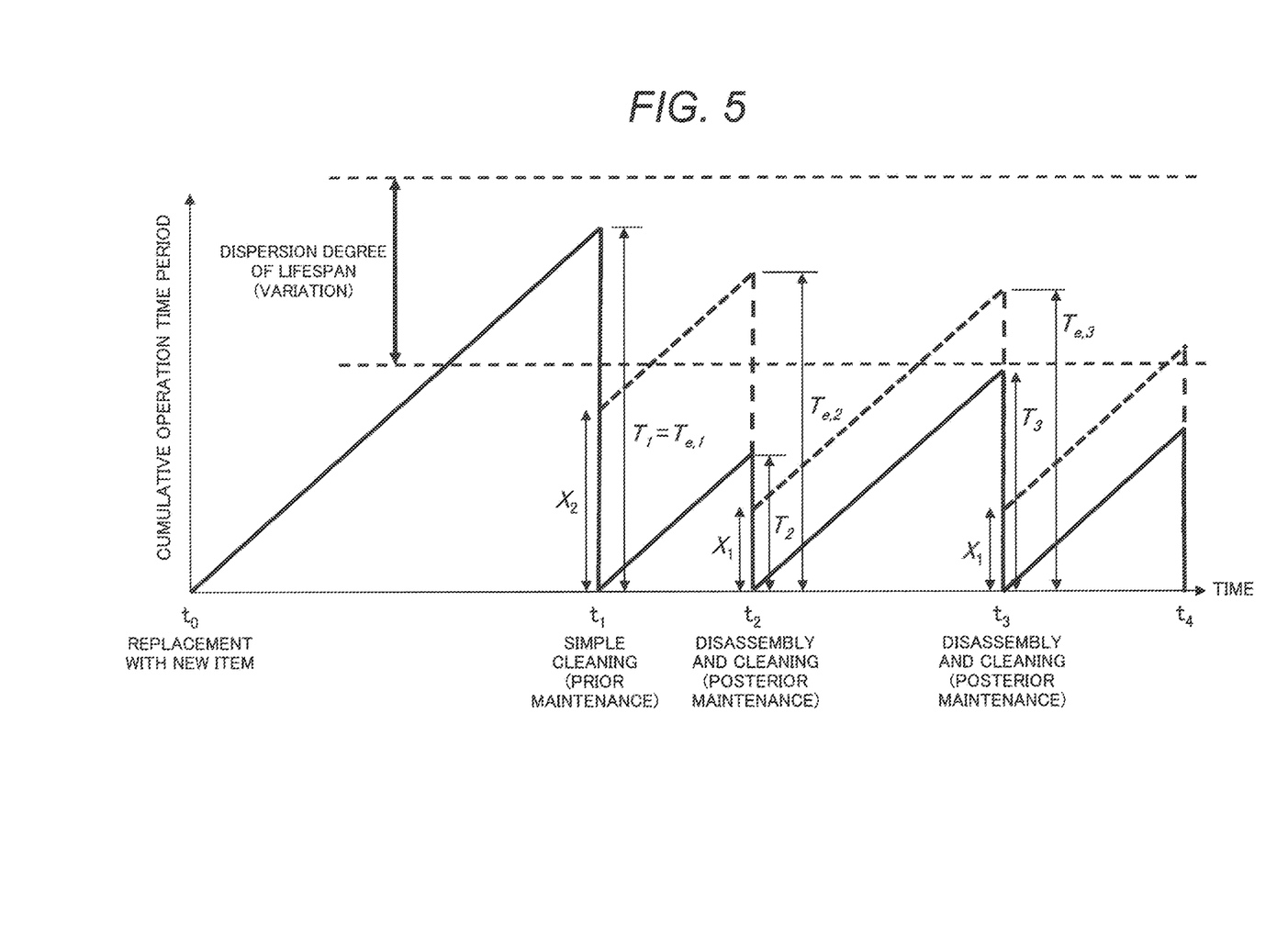
FIG. 5 is a schematic diagram for explaining the calculation of equivalent cumulative operation time periods based on damage residual amounts according to the example of the present invention.
Figure 6:
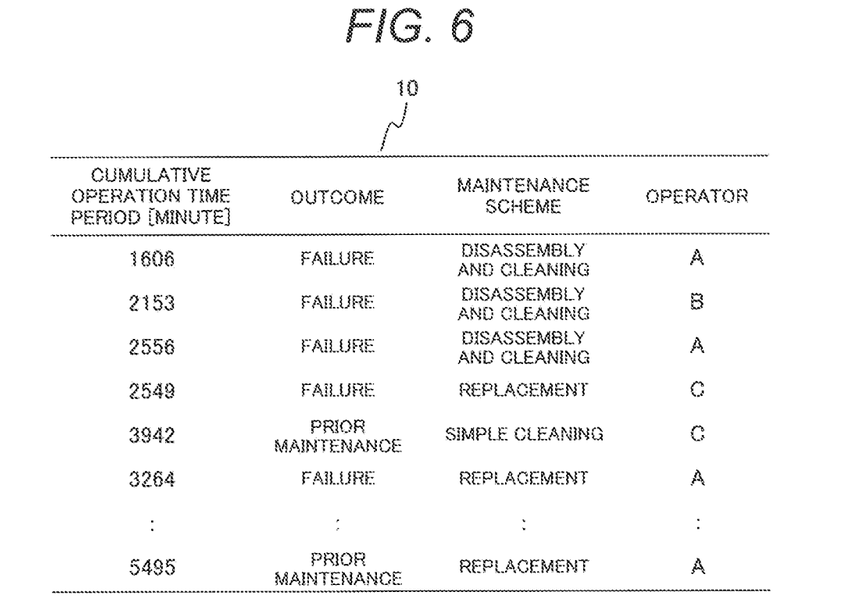
FIG. 6 is a diagram showing corrected survival time period data according to the example of the present invention.

Therefore, in this example, the effect of maintenance is reflected in a survival time period analysis by correcting a cumulative operation time period before a failure occurs or prior maintenance is executed on the basis of the content of the lastly executed maintenance. FIG. 5 shows an example of a method for correcting cumulative operation time periods in a schematic way. For example, let us consider a failure that occurs at the time $t_3$ after disassembly-and-cleaning is executed at the time $t_2$ in FIG. 5. In this case, it will be assumed that there remains a damage corresponding to an operation time period $X_1$ at the time just after the disassembly-and-cleaning is executed (the amount of a damage of this type is defined as a damage residual amount). Next, a cumulative operation time period until a failure occurs after the disassembly-and-cleaning is executed is expressed as $T_1$ ($=t_3-t_2$), and $X_1$ is added to the cumulative operation time period to correct the cumulative operation time period. In other word, an equivalent cumulative operation time period $T_{e,3}$ ($=X_1+T_3$) is newly introduced. In this case, a damage residual amount $X_i$, which is defined for a maintenance scheme of type i, is a parameter for quantitatively expressing the maintenance effect of the maintenance scheme of type i (a maintenance effect parameter 11). However, as long as the maintenance effect of each maintenance scheme is not quantitatively clear, the relevant maintenance effect parameter 11 has to be treated as an unknown parameter. Therefore, the equivalent cumulative operation time period $T_{e,n}$ cannot specifically be calculated in this stage. As a result, already-corrected survival time period data 10 is generated by temporarily giving an initial value that is set using a random number or the like to the damage residual amount $X_i$. The already-corrected survival time period data 10 is survival time period data including corrected equivalent cumulative operation time periods and outcomes as shown in FIG. 6.

Next, a failure probability function identification unit 12 will be explained. The failure probability function identification unit 12 identifies a failure probability function 13 on the basis of the technique of a survival time period analysis. A survival time period analysis is a statistical technique in which a survival curve (reliability degree function) or a failure probability function is identified using survival time period data as shown in FIG. 3 or FIG. 6. Roughly speaking, there are two survival time period analyses: a nonparametric method typified by the Kaplan-Meier method and a parametric method using a kind of hypothetical probability distribution. Although this example does not set limits on a survival time period analysis to be adopted, because a calculation is executed while attention is focused on the dispersion degree of a failure probability function, it is recommendable that the parametric method, in which the calculation of the dispersion degree can easily be executed using an index such as a variance, a standard deviation, or a variation coefficient on the basis of a probability distribution, should be adopted.

In the parametric method, a probability distribution such as the Weibull distribution is hypothesized for example, and a probability distribution parameter is identified using the maximum likelihood estimation method. Once the probability distribution parameter is defined, an index representing a dispersion degree can easily be obtained. The failure probability function identification unit 12 sets a dispersion degree index calculated on the basis of already-corrected survival time period data 10 as an objective function and repeatedly executes an optimization calculation to minimize this objective function. A damage residual amount $X_i$, which is an unknown parameter, is changed on the basis of the calculation result of the dispersion degree index and an optimization calculation algorithm, and this damage residual amount $X_i$ is passed to the maintenance effect correction unit 9. Successively, the failure probability function is identified again on the basis of the already-corrected survival time period data that is obtained again by the maintenance effect correction unit 9, and a dispersion degree index is calculated and evaluated. By repeating the above operation, it becomes possible to obtain a failure probability function 13 having a smaller dispersion degree while a likelier damage residual amount $X_i$ is repeatedly identified. Although this example does not set limits on an optimization calculation algorithm to be adopted in this case, if an advanced calculation algorithm such as a genetic algorithm or a particle swarm optimization algorithm is used, a wide range of problem settings can generally be dealt with.

In the above description, although a maintenance effect is modeled with a damage residual amount $X_i$, this example does not set limits on a modeling technique. In the case of the maintenance of a mechanical element such as a shaft bearing or a gear, to model a suppression effect on damage accumulation that appears after the maintenance is executed may be better than to model the recovery of a damage brought about by the maintenance in some cases.

Figure 7:
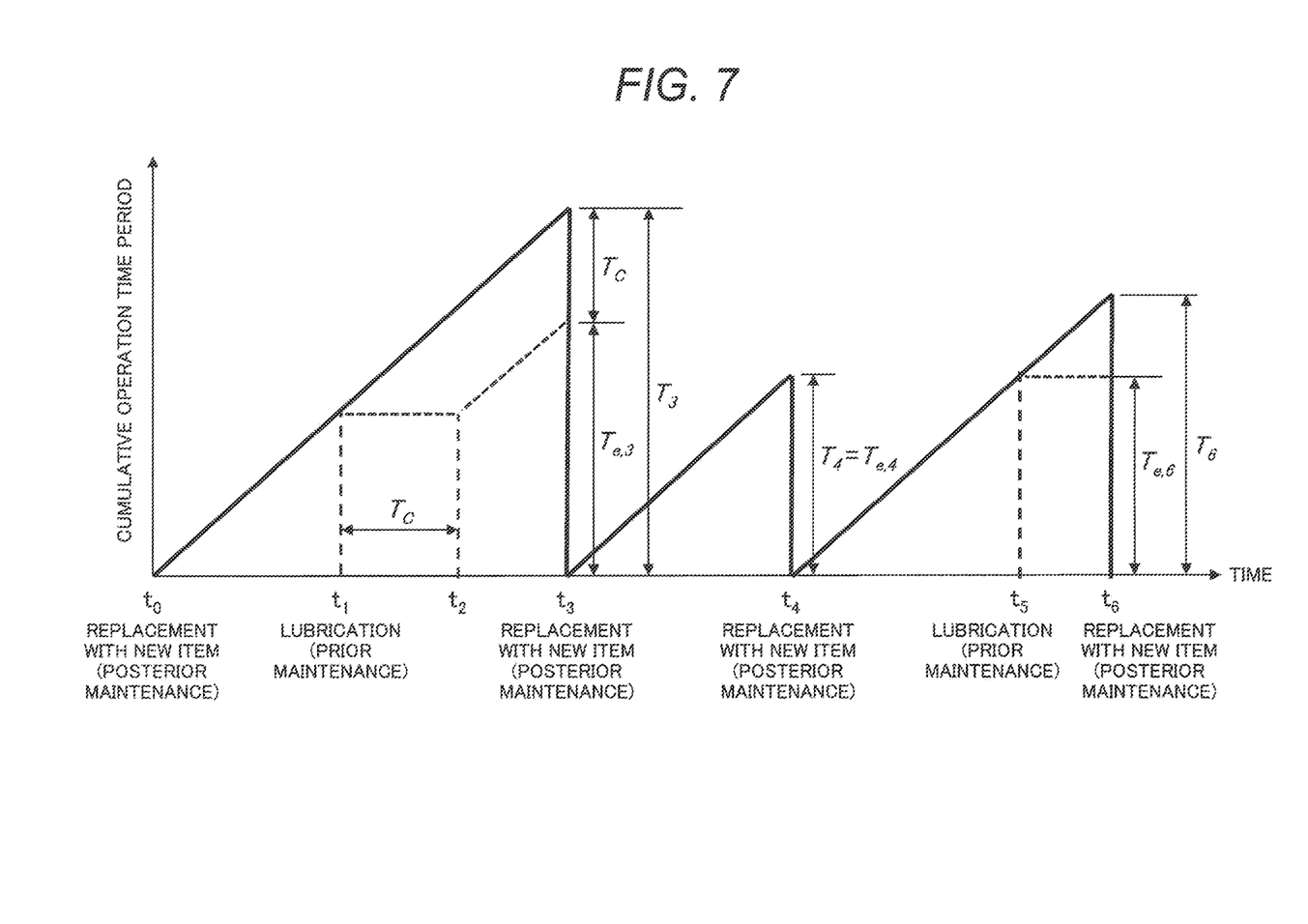
FIG. 7 is a schematic diagram for explaining the calculation of equivalent cumulative operation time periods based on maintenance effect duration time periods according to the example of the present invention.

These mechanical elements may get into a failure state due to the progresses of abrasions or fatigue cracks. These damage accumulations are eliminated if these mechanical elements are replaced. However, in the case of maintenance such as lubrication or grease-up maintenance being executed for example, the abrasions or fatigue cracks are not recovered, and it is more appropriate to think that the recovery of the lubrication states of the mechanical elements leads to the suppression of the progresses of these damages. In this case, as shown in FIG. 7, it is more appropriate to model such maintenance so that the accumulation of operation time periods is seemingly and temporarily suppressed after the maintenance is executed. Therefore, in the case where attention is focused on a failure that occurs at the time $t_3$ after lubrication is executed at the time $t_1$ for example, an equivalent cumulative operation time period $T_{e,3}$ is modeled as $T_{e,3}=T_3=T_c$, where $T_c$ is a maintenance effect duration time period and a kind of maintenance effect parameter 11.

Since the calculation formula of an equivalent cumulative operation time period is different depending on the modeling method of a maintenance effect, the calculation executed in the maintenance effect correction unit 9 varies accordingly, but since the failure probability function identification unit 12 executes an optimization calculation using a maintenance effect parameter 11 as an explanatory variable, a calculation flow executed in the failure probability function identification unit 12 does not vary. In this example, the methods, in which, for example, a maintenance effect duration time period in addition to a damage residual amount is adopted as a maintenance effect parameter and a failure probability function 13 is identified while a cumulative operation time period is corrected using these maintenance effect parameters, have been described so far. However, this example does not limit a modeling method of maintenance effects to these methods. Even in the case where a modeling method other than the methods exemplified so far is adopted, according to this example, the calculation in the maintenance effect correction unit 9 has only to be changed. In addition, combinations of methods based on plural types of modeling methods of maintenance effects and plural types of maintenance effect parameters may be used.

Although the above-described survival time period data generation unit 7, maintenance effect correction unit 9, and failure probability function identification unit 12 are respectively installed as computer programs, limits are not set to the concrete installation configurations of these computer programs in computers. For example, it is one aspect of this example that these programs are stored in the main storage unit of a computer, and calculations according to the respective programs are executed by processors such as CPUs. However, since the failure probability function identification unit 12 needs to execute calculation processing that is relatively costly while repeatedly calling out the maintenance effect correction unit 9, it is ideal that both failure probability function identification unit 12 and maintenance effect correction unit 9 should be installed in the same computer.

Figure 8:
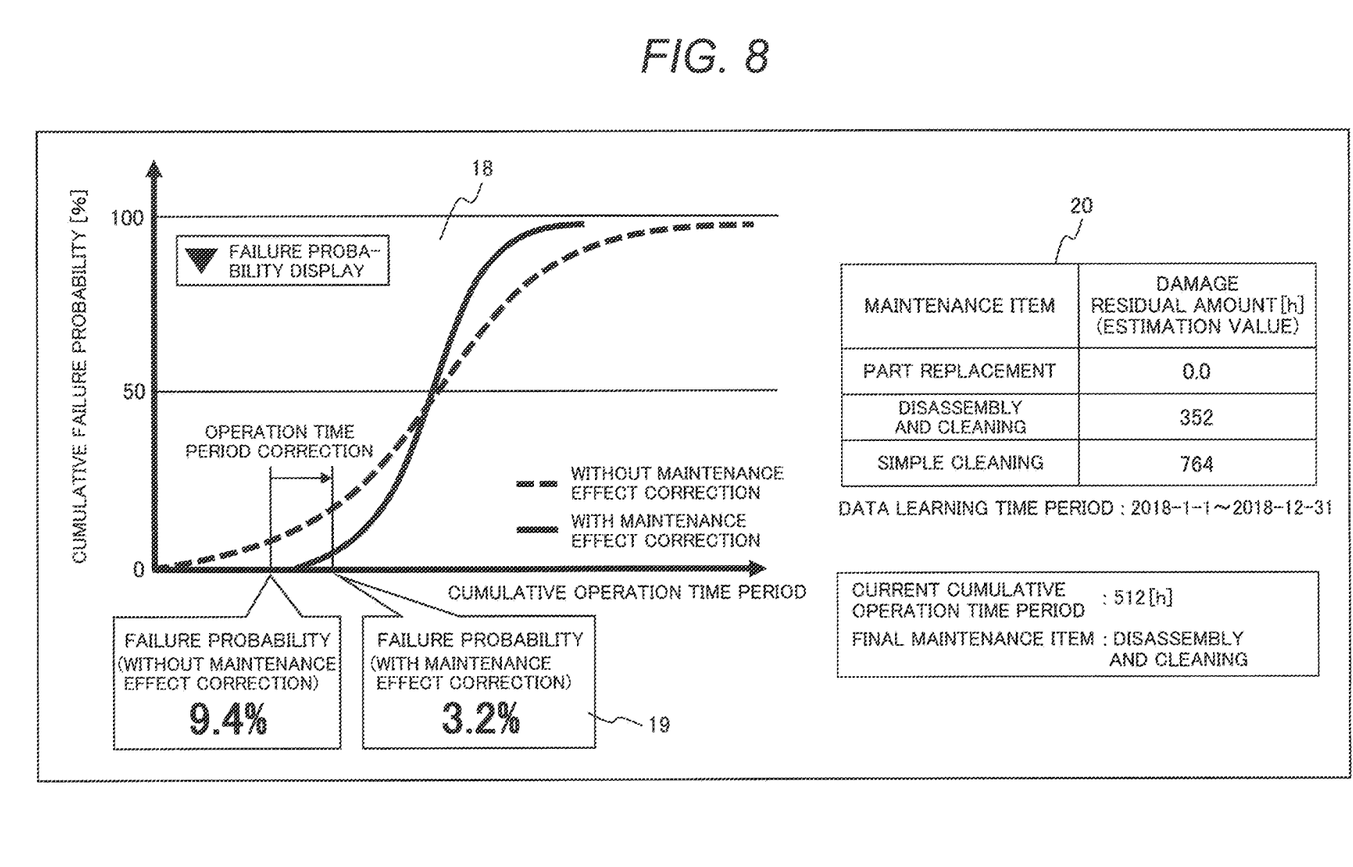
FIG. 8 is the configuration diagram of an example of a display unit according to the example of the present invention.

Next, an example of a display unit 14 will be explained. Although the display unit 14 is composed of a computer in which a screen drawing program is installed and a display device in concrete terms, it is all right if the computer used in this case is different from the respective abovementioned units (7, 9, and 12).

FIG. 8 shows an example of the display unit 14. The display unit 14 includes: a failure probability function display unit 18 for displaying a failure probability function 13 identified by the failure probability function identification unit 12; a failure probability display unit 19 for displaying a failure probability at the present time; a maintenance item display unit 20 for displaying estimated maintenance effect parameters for the respective items; an operation information display unit 21 for displaying a cumulative operation time period at the present time and the last executed maintenance item. In this example, in order to make a possibility that an item will fail at the present time easily understood, the failure probability function (F(t)) is displayed. However, if a reliability function (R(t)=1-F(t)) is displayed instead of the failure probability function (F(t)), it becomes easy to intuitively understand under how much reliability the item is operated at the present time. For example, if a function to be displayed can be switched using a pulldown menu 22, a user can easily switch displayed contents in accordance with the purpose of the user.

The failure probability function of an item provides useful information not only for calculating the failure probability and reliability of the item but also for estimating the life expectancy of the item and for performing appropriate management of parts inventory. Therefore, it is also effective to connect the failure probability evaluation system based on this example to a life expectancy estimation system 15, a parts inventory management system 16, and an operation/maintenance planning management system 17 that are subsystems equipped with these functions. In other words, it also possible that calculation results are analyzed using AI and the like, and that the analyzed results are applied to some kinds of services. For example, by connecting the failure probability evaluation system to the life expectancy estimation system 15, it becomes possible to materialize a service that tells the life expectancies of items. Furthermore, by connecting the failure probability evaluation system to the parts inventory management system 16, it becomes possible to highly accurately manage parts used for the maintenance of items (part replacement). In addition, by connecting the failure probability evaluation system to the operation/maintenance planning management system 17, it becomes possible to perform an appropriate operation/management of items (including to make a maintenance schedule). As another service, the failure probability evaluation system can be applied to the asset management of items and the like.

Here, the damage to an item may be affected by past maintenance. Therefore, it is preferable that, in the calculation of an equivalent cumulative operation time period, the calculation of plural damage residual amounts including at least the latest damage residual amount should be executed collectively.

Example 2

In Example 1, a damage recovery effect due to maintenance is reflected in a failure probability function by correcting a cumulative operation time period. In this case, it is assumed that the accumulation of damages to an item increases at a constant rate over time. However, in the case of taking up a wind power generation 27 as an example, loads borne by the respective parts and components of the wind power generator 27 momentarily vary depending on the operation state of the wind power generator 27. PTL 1 describes an invention in which a failure probability function is identified by executing a survival time period analysis in consideration of such an operation state that varies over time. In this invention, a system is described in which a damage model composed of plural physical quantities measured by sensors installed in a device are identified on the basis of the respective physical quantities so that a failure probability function having a small dispersion degree can be obtained. In other words, it can be said that a damage model having a load parameter is generated using a load event data including a load applied to an item and the occurrence time of the load. Therefore, if the system that is based on this example and shown in FIG. 1 and the system described in PTL 1 are combined, the identification of a more practical failure probability function can be realized in consideration of damage accumulation that momentarily varies, and both the damage recovery effect and the accumulation suppression effect brought about by maintenance.

Figure 9:
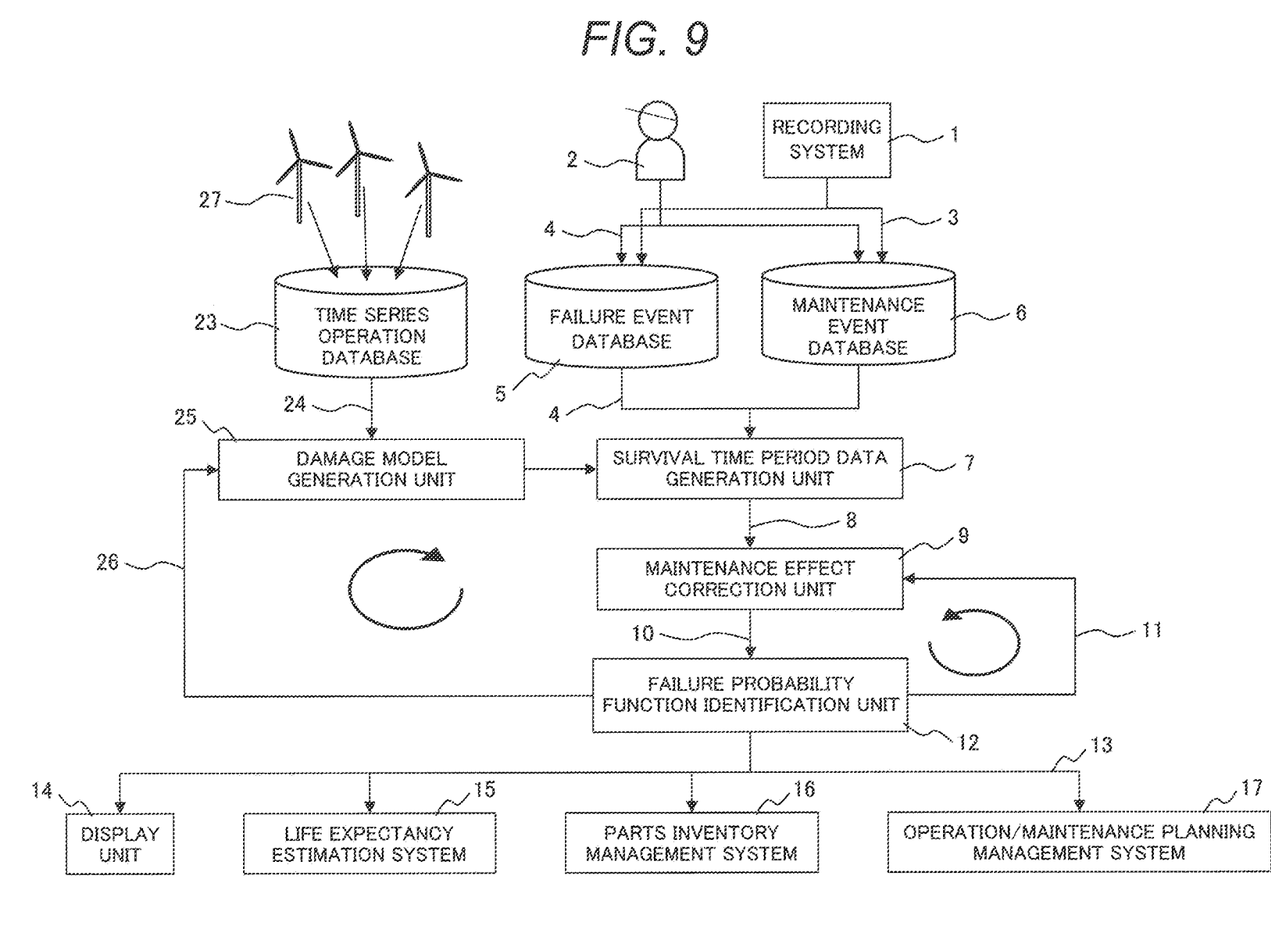
FIG. 9 is the configuration diagram of an example of a failure probability evaluation system according to an example of the present invention.

FIG. 9 shows an example of a configuration of a failure probability evaluation system that can take both operation state that varies over time and the maintenance effect into consideration. Here, as is the case with the description of PTL 1, first let us consider the following by replacing a failure probability function with respect to an operation time period with a failure probability function with respect to a cumulative damage. A cumulative damage (cumulative load) means a virtual quantity obtained by accumulating damages obtained by combinations of time series measurement data obtained by the measurements by a sensor over time. In a damage model generation unit 25, a damage model is generated from time series operation data 24 stored in a time series operation database 23, and a cumulative operation time period is converted into a cumulative damage. Successively, in a survival time period data generation unit 7, survival time period data based on the cumulative damage is generated. Subsequently, as is the case with Example 1, after a correction based on a maintenance effect is executed on the cumulative damage, a failure probability function is identified. Here, in Example 1, an optimization calculation that makes the dispersion degree index of a failure probability function 13 minimum is executed with a maintenance effect parameter 11 as a variable. However, in this example, an optimization calculation is executed with not only a maintenance effect parameter 11 as a parameter but also with a damage model parameter (load parameter) 26 added as another variable. Due to such a configuration of the optimization calculation, a failure probability function 13 having a smaller dispersion degree can be obtained while a damage model is identified and a maintenance effect is quantified.

Here, although a wind power generator is exemplified as an item in this example, the application target of the present invention is not limited to a wind power generator.

REFERENCE SIGNS LIST

1 . . . Recording System
2 . . . Operator
3 . . . Maintenance Event Data
4 . . . Failure Event Data
5 . . . Failure Event Database
6 . . . Maintenance Event Database
7 . . . Survival Time Period Data Generation Unit
8 . . . Survival Time Period Data
9 . . . Maintenance Effect Correction Unit
10 . . . Already-Corrected Survival Time Period Data
11 . . . Maintenance Effect Parameter
12 . . . Failure Probability Function Identification Unit
13 . . . Failure Probability Function
14 . . . Display Unit
15 . . . Life Expectancy Estimation System
16 . . . Parts Inventory Management System
17 . . . Operation/Maintenance Planning Management System
18 . . . Failure Probability Function Display Unit 19 . . . Failure Probability Display Unit
20 . . . Maintenance Item Display Unit
21 . . . Operation Information Display Unit
22 . . . Pulldown Menu
23 . . . Time Series Operation Database
24 . . . Time Series Operation Data
25 . . . Damage Model Generation Unit
26 . . . Damage Model Parameter
27 . . . Wind Power Generator

The invention claimed is:

1. A failure probability evaluation system for evaluating a failure probability of an item, comprising:
a processor configured to:
receive maintenance event data including a maintenance scheme for maintenance applied to the item and a time of the maintenance, and failure event data including a state about the failure of the item and an occurrence time of the state;
generate survival time period data that associates a cumulative operation time period which shows an operation time period between two maintenances of the item, the state, and the maintenance scheme using the maintenance event data and the failure event data;
generate, based on the survival time period data, an equivalent cumulative operation time period by adjusting the cumulative operation time period on the basis of the associated maintenance scheme, wherein the cumulative operation time period is adjusted by using optimization processing using a maintenance effect parameter as an explanatory variable, wherein the optimization processing is performed with respect to the maintenance effect parameter by changing a dispersion degree of a failure probability function;
calculate the failure probability function of the item using the generated equivalent cumulative operation time period and the associated maintenance scheme; and
display a graphic representation of the failure probability function of the item to a user via a display screen.

2. The failure probability evaluation system according to claim 1,
wherein to calculate the failure probability function, the processor is configured to generate the equivalent cumulative operation time period using the maintenance effect parameter that defines a damage recovery effect or a damage accumulation suppression effect for the item brought about by the maintenance of the maintenance scheme.

3. The failure probability evaluation system according to claim 1,
wherein to receive the failure event data, the prbcessor is configured to receive load event data including a load applied to the item and the occurrence time of the load,
to generate the survival time period data, the processor is configured to generate a damage model having a load parameter that defines a load applied to the item using the load event data and, as the survival time period data, generates survival time period data that associates a cumulative load applied to the item and the state using the load event data, and
to perform the optimization processing further, the processor is configured to perform optimization processing with respect to the load parameter.

4. The failure probability evaluation system according to claim 2,
wherein to calculate the failure probability function, the processor is configured to calculate an equivalent cumulative operation time period by subtracting/adding a time period defined by the maintenance effect parameter from/to the cumulative operation time period.

5. The failure probability evaluation system according to claim 3,
wherein to calculate the failure probability function, the processor is configured to subtract or add a load defined by the load parameter from/to the cumulative load.

6. A failure probability evaluation method for evaluating the failure probability of an item, comprising:
receiving, by a failure probability evaluation system, maintenance event data including a maintenance scheme for the maintenance of the item and a time of the maintenance, and failure event data including a state about the failure of the item and an occurrence time of the state;
generating, by the failure probability evaluation system, survival time period data that associates a cumulative operation time period showing an operation time period between two maintenances of the item, the state, and the maintenance scheme using the maintenance event data and the failure event data;
generating, by the failure probability evaluation system based on the survival time period data, an equivalent cumulative operation time period by adjusting the cumulative operation time period on the basis of the associated maintenance scheme, wherein the cumulative operation time period is adjusted by using optimization processing using a maintenance effect parameter as an explanatory variable, wherein the optimization processing is performed with respect to the maintenance effect parameter by changing a dispersion degree of a failure probability function;
calculating, by the failure probability evaluation system, the failure probability function of the item using the generated equivalent cumulative operation time period and the associated maintenance scheme; and
displaying, to a user, by the failure probability evaluation system via a display screen, a graphic representation of the failure probability function of the item.

7. The failure probability evaluation method according to claim 6, wherein calculating the failure probability function comprises generating, by the failure probability evaluation system, the equivalent cumulative operation time period using the maintenance effect parameter that defines a damage recovery effect or a damage accumulation suppression effect for the item brought about by the maintenance of the maintenance scheme.

8. The failure probability evaluation method according to claim 6,
wherein receiving the failure event data comprises receiving, by the failure probability evaluation system, load event data including a load applied to the item and the occurrence time of the load,
wherein generating the survival time period data comprises generating, by the failure probability evaluation system, a damage model having a load parameter that defines a load applied to the item using the load event data and, as the survival time period data, generates survival time period data that associates a cumulative load applied to the item and the state using the load event data, and
wherein performing the optimization processing comprises performing, by the failure probability evaluation system, optimization processing with respect to the load parameter.

9. The failure probability evaluation method according to claim 7, wherein calculating the failure probability function comprises calculating, by the failure probability evaluation system, an equivalent cumulative operation time period by subtracting/adding a time period defined by the maintenance effect parameter from/to the cumulative operation time period.

10. The failure probability evaluation method according to claim 8,
wherein calculating the failure probability function comprises subtracting or adding, by the failure probability evaluation system, a load defined by the load parameter from/to the cumulative load.

\* \* \* \* \*